Dec. 4, 1956     R. E. HARRINGTON     2,772,550
SHAFT AND SHIELD ASSEMBLY
Filed Sept. 2, 1955
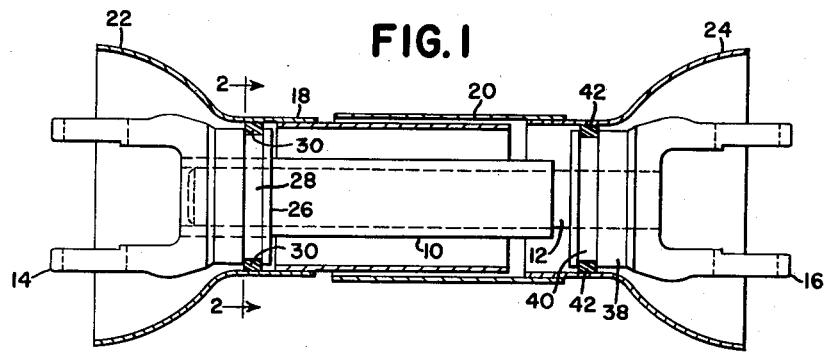
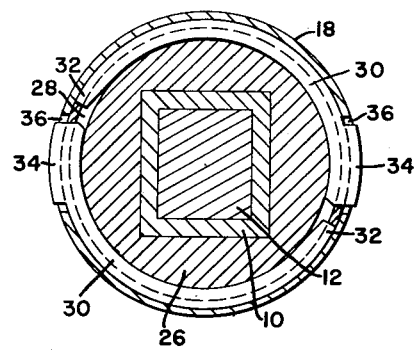
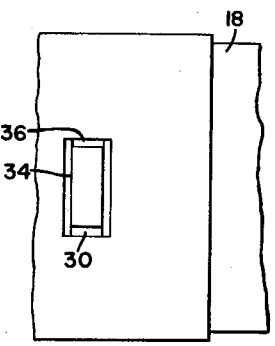
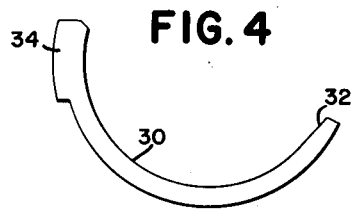
*INVENTOR.*
R. E. HARRINGTON United States Patent Office 2,772,550
Patented Dec. 4, 1956

2,772,550

SHAFT AND SHIELD ASSEMBLY

Roy E. Harrington, Moline, Ill., assignor to Deere & Company, Moline, Ill., a corporation of Illinois Application September 2, 1955, Serial No. 532,150

7 Claims. (Cl. 64—4)

This invention relates to a power shaft and shield assembly and more particularly to such assembly as used in the transmission of power between agricultural tractors and implements connected thereto.

The conventional tractor is ordinarily equipped, either regularly or optionally, with a rearwardly extending power take-off shaft which provides a source of power for the driving of implements connected to or mounted on the tractor. Various efforts have been made in the past to enclose or shield the propeller shaft that establishes the driving connection between the power take-off shaft and the input shaft on the implement, the prime consideration being the safety of the operator. For many years, the industry has accepted and relied upon a non-rotatable shield in the form of a tunnel spanning the articulate connections. In some cases, the tunnels have been made non-removable as respects the propeller shaft, thereby avoiding the possibility that the user will consider the shield a nuisance and discard it. More recently, the trend has been toward the development of a simpler shield, yet one that retains the necessary safety features. Such a shield is provided according to the present invention in the form of a tube that concentrically encircles the propeller shaft. Because of the possibility of damage to the shield without similar damage to the shaft, it is desirable to include some form of connection whereby the shield may be removed from the shaft without destroying the shaft. There is also the possibility that damage may result to the shaft while the shield is still suitable for use. In the type of shield in which the shield is supported directly on the shaft rather than on either or both the tractor or implement, the shield will normally rotate with the shaft because of friction in the bearings, but the bearings or other mounting must be such that the shield can be stopped while the shaft continues to rotate so that in the event that an operator contacts the shield, it will not rotate and thus wrap his clothing or otherwise injure him. According to the present invention, a simplified and improved form of bearing is provided for mounting the shield on the shaft. The invention features further the use of improved means serving as both bearing means and interconnecting means, residing primarily in the use of one or more arcuate members insertable circumferentially through a slot in the shield and following a circumferential groove in the shaft. It is also an object of the invention to utilize these features in telescopic shaft assemblies, in which a pair of shafts are telescopically interconnected for rotation together but for axial telescoping and a pair of shields are similarly arranged, one being journaled on and interconnected with each shaft in such manner that each shield may rotate relative to its shaft but each shield is axially non-displaceable relative to its own shaft.

The foregoing and other important objects and desirable features inherent in and encompassed by the invention will become apparent as a preferred embodiment of the invention is disclosed in detail in the ensuing specification and accompanying sheet of drawings, the several figures of which will be described immediately below.

Fig. 1 is a longitudinal sectional view through a shaft and shield assembly of the telescopic type.

Fig. 2 is a transverse sectional view, on an enlarged scale, as seen along the line 2—2 of Fig. 1.

Fig. 3 is an elevational view of the structure shown in Fig. 2.

Fig. 4 is a view of one of the bearing and interconnecting members per se.

The shaft and shield assembly chosen for the purposes of illustration is in general typical of a propeller shaft assembly used between the power take-off shaft of a tractor and the input shaft of an associated implement. To that extent, the assembly comprises first and second shafts 10 and 12, the former being tubular to telescopically receive the latter. The shafts are provided, respectively, at their remote ends with universal joint knuckles 14 and 16. The shield portion of the assembly comprises first and second tubular shield sections 18 and 20, the former being mounted on the shaft 10 and the latter being mounted on the shaft 12, the means for which will be described below. The shield section 18 is smaller than and is telescopically received by the shield section 20. The shield section 18 is enlarged or bell-shaped at one end, as at 22, and a similar configuration at 24 is given to the other section 20.

The buckle 14 for the shaft 10 has an integral collar or sleeve portion 26 in which is formed a circumferential or annular groove 28. This structure thus affords means on the shaft 10 for cooperating with additional means, to be immediately described, for mounting the shield section 18 rotatably on the shaft 10 but in a manner preventing relative axial displacement. This additional means preferably comprises a plurality, here two, of arcuate members 30, one of which is shown in Fig. 4. Each member has a tapered leading portion 32 and a trailing portion that is in the form of a projection 34 that extends radially outwardly through a slot or aperture 36 in the shield section 18, the aperture 36 being in radial register with a portion of the annular groove 28 when the components are assembled. There are two slots 36 and these are diametrically opposed (Fig. 2). The arcuate members are flexible and preferably of a non-metallic material such as one of the better known plastics suitable for bearings, such as nylon. Because of the flexibility of each of the arcuate members, it is capable of deformation to the extent enabling circumferential insertion thereof through the associated slot or aperture 36, the leading portion 32 being inserted first and the member being forced to travel in a circumferential path until the projection 34 seats or is received in the associated slot. One member is inserted from each side so that the two combine to provide a substantially ring-like assembly. Since the projections 34 are received in the slots 36, and since the arcuate portions of the members are received in the annular groove 28 of the sleeve 26, the tube section 18 is journaled on the shaft 10 and at the same time is held against axial displacement relative to the shaft. It is understood of course that the knuckle 14 is rigidly affixed to the shaft 10, as by welding or any other suitable means.

The shield or tube section 20 is mounted on the knuckle 16 by similar means which, since identical to those just described, will be adverted to only briefly. Accordingly, the knuckle 16 has thereon a collar or sleeve 38 in which an annular groove 40 receives a pair of arcuate members 42 identical to the members 30. The tube section 20 has diametrically opposed apertures (not shown, but apparent from the description of the apertures 36) to receive projections (also not shown, but apparent on the same basis as 34) for holding the tube section 20 against axial displacement relative to the shaft 12.

From the foregoing description, it will be seen that each tube section is mounted on its shaft by means serving as both a retaining ring and a bearing. In normal operation, the frictional drag between each tube section and its shaft is expected to be sufficient to cause the tube section to rotate as the shaft rotates, thus minimizing wear on the arcuate members 30—30 or 42—42. However, should a person come into contact with either of the tube sections, the tube section will stop, while the shaft continues to rotate. Consequently, there is no danger that the operator's clothing will be wrapped on the assembly. Each of the arcuate members is readily removable by withdrawing same from its groove, which facilitates servicing of the assembly, particularly the replacement of a part that is damaged. The combination retaining and bearing means are simple in construction and the entire assembly is lightweight and economical, at the same time affording all of the safety features deemed desirable in a construction of this type.

Other features of the invention not categorically enumerated will undoubtedly occur to those versed in the art, as will many modifications and alterations in the preferred embodiment illustrated, all of which may be achieved without departure from the spirit and scope of the invention.

What is claimed is:

1. A power shaft assembly, comprising: a shaft; means concentrically on the shaft and affording an externally opening annular groove; a tubular shield concentrically encircling the shaft and having an opening therethrough in radial register with a portion of the aforesaid groove; and a flexible arcuate member introduced through said opening and circumferentially into and around at least part of the groove and engaging the shield to interconnect the shield and shaft for relative angular movement and against relative axial displacement.

2. The invention defined in claim 1, in which: the arcuate member has a tapered leading end to facilitate entry thereof into the opening and groove.

3. The invention defined in claim 1, in which: the arcuate member has a trailing end portion including a projection extending radially into the shield opening and operative to establish the anti-axial-displacement relationship between the tube and shaft.

4. A power shaft assembly, comprising: a shaft; means concentrically on the shaft and affording an externally opening annular groove; a tubular shield concentrically encircling the shaft and having a pair of diametrically opposed openings therethrough respectively in register with diametrically opposed portions of the groove, and a pair of arcuate members of substantially semi-circular extent introduced respectively through the openings and into the groove and extending semi-circumferentially about the groove respectively in opposite angular directions and engaging the shield to interconnect the shield and shaft for relative angular movement and against relative axial displacement.

5. The invention defined in claim 4, in which: each arcuate member has a trailing end portion including a projection extending radially into the associated shield opening and operative to establish the anti-axial-displacement relationship between the tube and shaft.

6. The invention defined in claim 1, in which: the means concentrically on the shaft comprises a universal joint knuckle having a sleeve portion including said annular groove.

7. A power shaft assembly, comprising: first and second telescopically interconnected shafts respectively having first and second means concentrically thereon and affording first and second annular grooves opening radially outwardly and axially spaced apart; first and second telescopically related tubular shields concentrically encircling the shafts, said first tube having a portion adjacent to the first groove and said second shaft having a portion adjacent to the second groove, each tube portion having an opening therethrough in radial register with a portion of the respective groove; and first and second means connecting the first and second shields respectively to the first and second shafts to journal each tube on its shaft and to constrain each tube and its shaft against relative axial displacement, each connecting means including a flexible arcuate member introduced through the associated opening and circumferentially into and at least part way around the associated groove.

No references cited.